Sept. 7, 1937.    R. A. HURST    2,092,418
NONREFLECTING SHOP FRONT AND THE LIKE
Filed Oct. 28, 1935
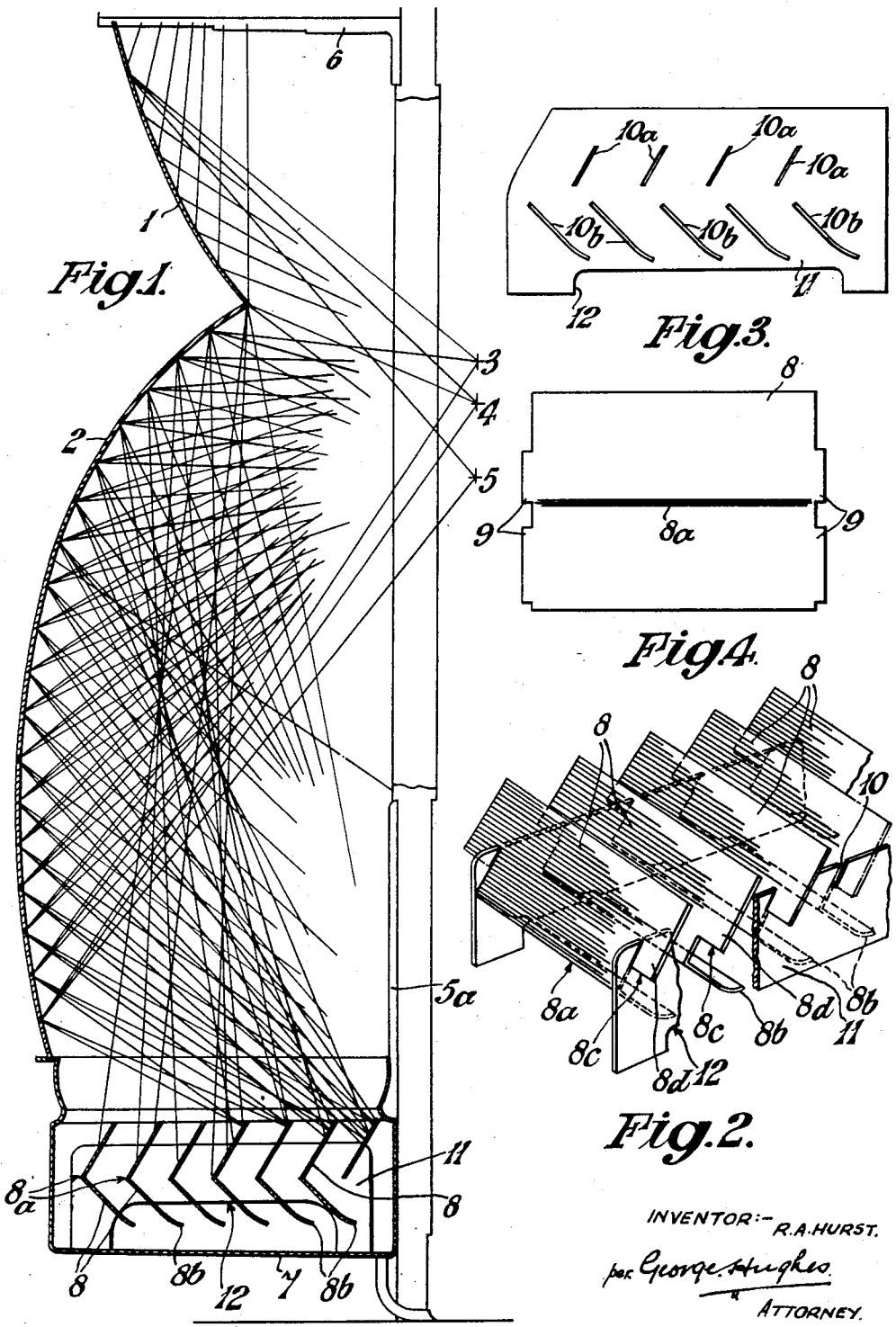
INVENTOR:- R.A.HURST.
per George Hughes
ATTORNEY.

88. OPTICS

UNITED STATES PATENT OFFICE

2,092,418

NONREFLECTING SHOP FRONT AND THE LIKE

Reginald Arthur Hurst, London, England, assignor of one-half to William Edwin Dunn, Holland, Mich.

Application October 28, 1935, Serial No. 47,160
In Great Britain March 8, 1935

3 Claims. (Cl. 88—1)

This invention relates to shop windows and the like and more particularly to the kind in which the window has a curvilinear configuration, the curvature being maintained along substantially the full height of the window. In present practice such windows have combined therewith a light absorbing surface, or surface of low luminosity usually arranged somewhat trough fashion in front of the lower part of the window, so that the reflections from the window of external objects are nullified. Such an arrangement enhances the appearance of articles displayed in the shop window or the like and also materially facilitates vision through the window.

In one form adopted in existing practice, one light absorbing surface is provided by or on the inner or rear surface of the dado or "baffler" forming part of the bottom structure of the shop front, and another is formed by or on a flat or curved surface extending towards the bottom of the window from the bottom of the dado or "baffler", the effect of which is to constitute a trough between the window and the outer limits of the shop front.

In this trough dust collects and by its presence detracts from the light absorbing properties of the surfaces of the trough, and continual removal of the dust by brushing has a similar effect. In addition, passersby frequently dispose of rubbish in the nature of spent matches, small pieces of paper, cigarette ends and cartons, by casting them into the trough whence they become visible, by reflection in the window, to a person inspecting the goods displayed.

Under certain conditions it is possible for the sun's rays to strike directly on to the bottom of the trough and impair the non-reflecting properties of the window, and also it occasionally happens that the light source or sources of artificial illumination is or are so situated with respect to the baffler as to prevent the desired extent of absorption by the baffler.

Lastly, in cases where the wind drives heavy rain directly towards the shop front the bottom of the trough sometimes becomes converted, by the presence of water, into a reflecting surface which is detrimental to the efficiency of the nonreflecting window.

The object of the present invention is to obviate the beforementioned disadvantages and with this object in view the present invention broadly consists in the provision of a plurality of light baffles arranged in a plurality of spaced lines in front of and beneath the window. One advantage of the arrangement of baffles according to one form of this invention is that it permits the passage of articles through it into the trough like base, or a shallow removable tray in such base.

One form of the present invention can be regarded as consisting in the provision between the usual dado or "baffler" and the lower portion of the window, of a non-reflecting area whereof the continuity is broken, such as by the plurality of longitudinal fins or ribs of any suitable material, whether naturally of a light absorbing nature or whereof the surface of each is prepared or treated in such manner as to render it light absorbing.

These fins or ribs may be fixed in position, or they may be mounted adjustably, parallel with the window, and the "baffler" towards which latter they are preferably inclined, and they are also preferably of such a height above the bottom of the trough as to mask from the window any small objects of the kind above referred to which may be thrown into the trough by the public.

In addition to shop fronts, the invention is also applicable to certain types of show-cases, principally those designed to stand permanently or temporarily outside a building or outside premises being re-built.

In order that this invention may be clearly understood and readily carried into effect I have appended hereto a sheet of drawings illustrating an embodiment thereof and wherein:—

Fig. 1 is a sectional side elevation showing the invention applied to a shop window front of the type in which the window consists of curvilinear parts in known manner.

Fig. 2 is a detail perspective view showing a suitable method of assembling the longitudinal fins or ribs.

Fig. 3 is a detail side elevation view of a partition or support for one end of a set of bafflers and showing an alternative method of supporting them, and Fig. 4 is a lay out view of one of such alternative forms of bafflers.

Referring to the drawing, in the embodiment illustrated in Fig. 1 the window consists of an upper arcuate sheet of glass 1 joining integrally a lower larger sheet of glass 2 also of arcuate vertical cross section. Such an arrangement of window is already known and enables the normal height of vision of persons standing in front of the shop window to provide an approximate focal point or line of sight because as will be seen from Fig. 1 if the points 3, 4, 5 are regarded as representing the source of vision points of persons of different height, it will be seen that the rays from such points are reflected by the glass 2 downwardly at a steep angle so as to be confined in a zone between a front dado or "baffler" 5a and the base of the window. The rays passing upwardly into the shallower curved glazing 1 are reflected upwardly upon an overhead baffler 6 coated black or otherwise rendered as non-reflecting as possible.

The present invention is more particularly concerned with improving the means for preventing reflection of light rays back on to the window from the space between it and the dado or baffler 5a. In present practice a trough like base 7 is provided beneath the dado 5a and a disadvantage of this trough per se is that at present it has a single plane surface or a curved surface, and it is found that such a surface does not have the desired efficiency. Sometimes exposure to sun and the dust, rain and other outdoor conditions destroys its light absorbing qualities, whilst rain water and foreign articles which might collect therein also detract from its efficiency. In order to overcome these disadvantages the present invention incorporates a plurality of vanes or ribs 8 preferably of substantially V section and arranged in a longitudinal direction of the window inside the trough 7. The vanes or ribs 8 can be equidistantly spaced as shown and preferably are so arranged that their upper edges are in advance of their corners or elbows 8a, and it is preferred that their lower edges 8b shall be slightly in advance of such corners 8a so that there is no direct vision of the base of the trough 7. The vanes 8 are preferably curved towards their lower edges 8b as shown in Fig. 1 in order to provide an effective screen against reflection from the base of the trough and also to facilitate the easy flow of rain water or other substances or commodities between the vanes to the base of the trough 7. It is also preferred that each upper edge of each vane shall be substantially immediately above the corner 8a of the next vane in succession.

The upper limbs of the substantially V section vanes are inclined upwardly and forwardly and the lower ones are nearly at right angles thereto, and consequently if these vanes are made of light absorbing material or are treated so that they do not reflect light to any substantial extent, it will be apparent that they can be so arranged that the angles of incidence of the light rays from the window and other sources will definitely prevent reflection of light back on to the window. Still further the said vanes will permit articles to pass between them and will positively screen such articles from reflection on to the window.

It will be seen from Fig. 1 that the dado extends a sufficient height in front of the window to act as a screen to prevent reflection of articles in front of the trough 7.

The means for supporting the vanes 8 may take any suitable form, but a convenient method of arranging the vanes in sets in order to obtain continuity thereof along the trough 7 is shown in Fig. 2 in which the vanes 8 have a step 8c at each end to provide lugs 8d which can be slid into upstanding partitions 11, formed with inclined slots 10 in their upper edges to receive such lugs. The vanes 8 are bent longitudinally at 8a as hereinbefore mentioned and their lower limbs abut against the opposed sides of the partitions 11. The overhanging lugs 8d enable a number of sets of vanes to be located end to end without gaps between them as with thin sheet material the lugs 8d could overlap.

In the modification shown in Figs. 3 and 4 the vanes 8 are each formed at each end with lugs 9 which are engaged in two pairs of slots 10a and 10b formed in partition plates 11, such slots having the configuration it is desired to impart to the vanes. Each vane may be composed of two sheets joined together along the edges constituting the corner 8a, such joining permitting of a hinging movement of the two relevant parts, for example, by fitting a narrow strip of flexible material across the opposed edges of such two parts.

The vanes 8 may be sheets of material coated with a black or other suitable light absorbing substance, or they may be composed of a sheet material of low reflectivity. The plates 11 are recessed at their lower edges as at 12 for the major portion of their length to provide a clearance from the base of the trough to enable articles and substances to pass under the plates 12.

What I claim is:—

1. A non-reflecting shop front, show case and the like comprising a glass window bent upwardly forwardly so that its external face is partly arched, a base extending horizontally beyond the front of the window from a point below the lower end of the window, a plurality of vanes located just above the base, the said vanes being arranged in the longitudinal direction of the window and spaced from each other, the said vanes having non-reflecting surfaces and being composed of upper parts inclined upwardly and forwardly to intercept incident rays of light from the window to prevent reflection back on to the window and lower downwardly and forwardly inclined parts acting as screens to intercept light reflected from said base.

2. A non-reflecting shop front, show case or the like comprising a glass window arched upwardly and forwardly so that its upper end projects forwardly beyond its lower part, a trough like space in front of the lower end of the window, a plurality of substantially V section vanes in said trough like space having non-reflecting surfaces and arranged in the longitudinal direction of the window with their apices between their upper and lower edges and directed towards the window, the upper limbs of the substantially V section vanes being inclined so as to intercept and prevent reflection back of incident rays of light reflected from the window, the lower edges of the vanes being located close to the base of the trough like space.

3. A non-reflecting shop front, show case or the like comprising a glass window arched upwardly and forwardly a trough like structure in front of the lower end of said window and a plurality of vanes having non-reflecting surfaces and extending substantially parallel with the longitudinal direction of the window, and having upper and lower longitudinal sides with intermediate corners substantially V fashion with the apices of the V's directed towards the window side, the lower edge of each vane intersecting the vertical plane containing the intermediate corner of the next vane in succession, the upper parts of said vanes being inclined so as to intercept rays of light reflected downwardly forwardly from the window so as to prevent reflection back on to the window.

REGINALD ARTHUR HURST.